United States Patent
Bak

Patent Number: 5,246,672
Date of Patent: Sep. 21, 1993

[54] SPIRAL WOUND MICROLITH CATALYST BED

[75] Inventor: Michael J. Bak, White Lake, Mich.

[73] Assignee: Williams International Corporation, Walled Lake, Mich.

[21] Appl. No.: 872,342

[22] Filed: Apr. 23, 1992

[51] Int. Cl.⁵ ............... F01N 3/10; B01D 50/00; B01J 21/04

[52] U.S. Cl. ............... 422/174; 422/177; 422/180; 60/299; 60/300; 502/439; 502/527

[58] Field of Search ............ 422/173, 174, 177, 180; 60/299, 300; 55/DIG. 30; 502/439, 527

[56] References Cited

U.S. PATENT DOCUMENTS

| | | | |
|---|---|---|---|
| 3,770,389 | 10/1973 | Kitzner et al. | 422/180 |
| 4,388,275 | 6/1983 | Fratzer et al. | 422/180 |
| 4,987,034 | 1/1991 | Hitachi et al. | 422/180 |
| 5,051,241 | 9/1991 | Pfefferle | 422/180 |
| 5,070,694 | 12/1991 | Whittenberger | 60/300 |

*Primary Examiner*—James C. Housel
*Assistant Examiner*—N. Bhat
*Attorney, Agent, or Firm*—Lyman R. Lyon

[57] ABSTRACT

A microlith catalyst bed for use in automotive catalytic converters or gas turbine catalytic combustors. The microlith catalyst bed of the present invention advantageously utilizes a wire cloth (10) woven to form a spiral wound flat helix (or coil). Woof wires (14) are woven into warp wires (12) in a polar weave pattern. There is no leftover scrap when forming the microlith catalyst bed. Warp wires (12) further carry electrical current via bus bars (106, 108) for electrically heating the catalyst bed. Lightoff time for the bed is significantly reduced due to the heating.

9 Claims, 1 Drawing Sheet

SPIRAL WOUND MICROLITH CATALYST BED

BACKGROUND OF THE INVENTION

The present invention relates generally to catalytic reaction systems, and more particularly to microlith catalyst beds for improving catalytic conversion efficiency.

In the past, typical catalytic convertors for oxidation of carbonaceous fuels, for example as used in automotive emissions, have used unitary structures such as an assembly of interlocking sheets of catalyst material to form a catalyst bed. This type of structure is referred to as a monolith catalyst. However, the performance of monolith catalysts have been limited by the fact they are not generally effective until the catalyst has heated up to its operating temperature. Monolith catalysts suffer from long warmup (lightoff) time. Further, they generally do not provide satisfactory high catalytic conversion efficiency.

In U.S. Pat. No. 5,051,241, William C. Pfefferle, discloses a microlith catalytic reaction system which provides a more effective catalytic conversion than conventional monolith converters when operating in what is known as the mass transfer limited region of catalyst operation. In the mass transfer limited region of operation, the reacting chemical species must diffuse through a boundary layer and reach the catalyst surface for the catalyst to be effective in its function of accelerating reaction rates. The microlith catalyst system of Pfefferle provides quicker lightoff and higher conversion efficiency due to high open area microlith catalyst elements having flow channels with a flow path length no longer than about two times the diameter of the largest flow channel. Pfefferle further teaches the ability to electrically heat the microlith catalyst to further reduce the lightoff time.

The system of Pfefferle utilizes multiple layers of microlith catalyst support to obtain the total surface area required to achieve the desired reaction rate. To provide the electrical heating, an electrical path can be implemented by either a series connection passing through each layer of microlith catalyst with jumper connections between each layer, or a parallel connection where a common power bus connects all layers to the power supply. Both of these wiring configurations require numerous electrical connections that drive up cost and reduce reliability of the system.

It is also noted that in many applications, the microlith layers will be circular disks cut from flat sheets of fine mesh screen or expanded metal. This operation may result in a significant quantity of leftover scrap. Further, if the catalyst material is applied to the fine mesh at the time the mesh is manufactured, the cost of the leftover scrap could be very expensive.

Further problems occur with prior art catalyst support designs when applied to catalytic combustors used in gas turbine engines. Typical catalytic combustors operate in what is known as the homogenous gas phase reaction region of catalyst operation. In this region, most of the chemical reactions take place in the freestream off of the catalyst surface. The catalyst contributes to the overall reaction by reacting with a small portion of the total reactant stream to promote the formation of chemical radicals. These radicals in turn increase the reaction rate of the chemical species reacting in the freestream.

However, when gas turbines are operated at low power outputs, the catalytic combustor may be forced to operate in the slower mass transfer limited range (described hereinabove) due to cooler operating temperatures. Since gas turbine catalytic combustors are typically designed for minimum volume, the combustor may not have sufficient catalyst surface area to operate efficiently in the mass transfer limited region.

SUMMARY OF THE INVENTION

It is therefore an object of the present invention to provide an improved microlith catalyst system which reduces the cost of manufacture.

It is also an object of the invention to provide a microlith catalyst system which improves catalytic conversion efficiency of a catalytic combustor when a turbine engine is operating at a low output.

It is further an object of the present invention to provide a microlith catalyst bed which has improved durability and reliability.

In accordance with the present invention, a spiral wound microlith catalyst bed for use in a catalytic reaction system for the conversion of carbon containing compounds comprises a plurality of parallel warp wires coated with catalyst material, where each of the plurality of warp wires increases in length from a shortest length warp wire to a longest length warp wire. A plurality of woof wires coated with catalyst material are woven across the plurality of parallel warp wires. The plurality of warp wires and the plurality of woof wires thus form a spiral wound flat helix wire cloth.

In the microlith catalyst bed of the present invention, the shortest warp wire forms an inner radii of the flat helix, and the longest warp wire forms an outer radii of the flat helix. Some of the plurality of woof wires extend across the plurality of warp wires from the outer radii to the inner radii, and the remainder of the plurality of woof wires extend across the plurality of warp wires from the outer radii to a varying intermediate warp wire in between the outer radii and inner radii. To facilitate electrical heating of the microlith catalyst bed, a first electrical contact means is connected to one end of the flat helix wire cloth, and a second electrical contact means is connected to the other end of the flat helix wire cloth. The first and the second electrical contact means provide connection to an external power source for passing an electrical current through the flat helix wire cloth. A plurality of insulator means are further attached to the wire cloth to electrically insulate adjacent layers of wire cloth.

The present invention further provides a microlith catalytic reaction system for the conversion of carbon containing compounds which comprises a housing made from an insulating material having an inner hub and an outer shroud. A microlith catalyst bed is formed from a spiral wound wire cloth, with the spiral windings of the wire cloth located in the housing between the inner hub and the outer shroud. The carbon containing compounds pass axially through each spiral winding layer of the wire cloth.

The present invention will be more fully understood upon reading the following detailed description of the preferred embodiment in conjunction with the accompanying drawings.

DETAILED DESCRIPTION OF THE PREFERRED EMBODIMENT OF THE INVENTION

Figure 1:
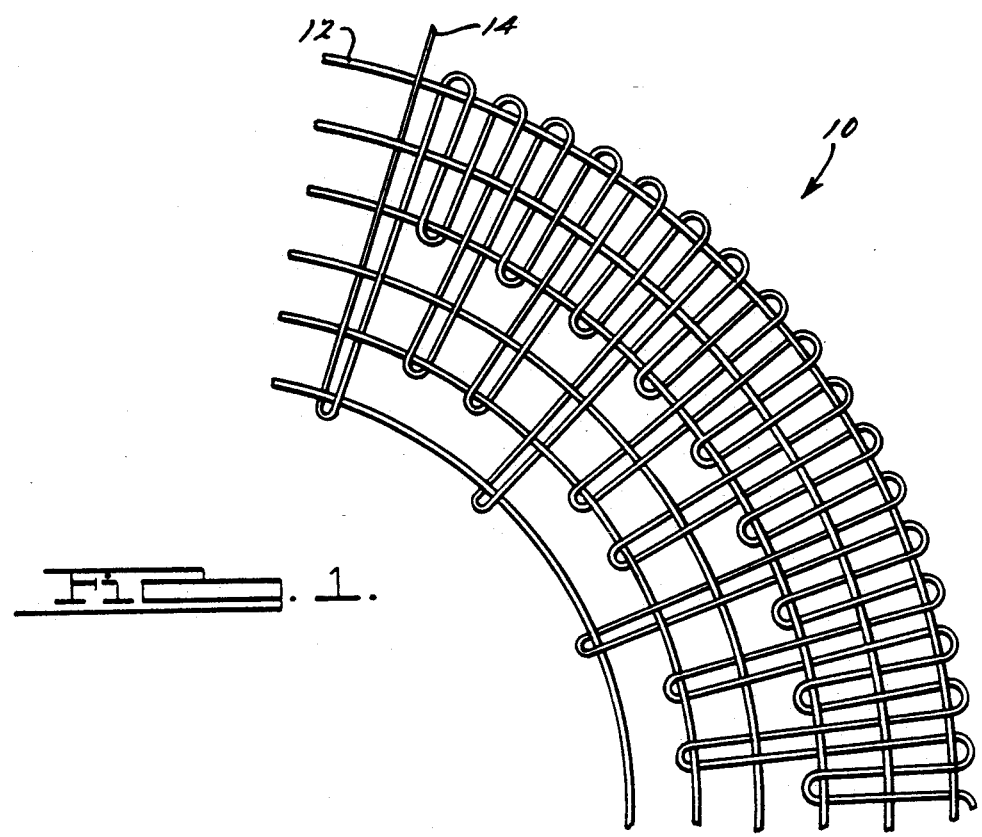
FIG. 1 is a diagram illustrating the microlith catalyst bed in accordance with the present invention.

Referring to FIG. 1 there is shown a spiral wound catalyst bed in accordance with the present invention comprising a single piece of wire cloth 10 formed into a flat helix (or flat coil) using unique polar weaving techniques. During the weaving process, varying lengths of parallel, longitudinal fibers or wires 12 (known as warp elements) of the cloth 10 are fed into a loom. Warp wires 12 at the inner radii of the flat helix will have a lower feed rate than the warp wires at the outer radii.

Cross-weave filler fibers or wires 14 (shown in the drawings as a single continuous fiber) are woven through the warp wires 12 to form the cloth 10. The filler wires or fibers 14 are also known as woof wires or fibers. The woof wires 14 are woven so that some woof wires wind from the outer to the inner radii of the flat helix, and other woof wires only wind from the outer radii to an intermediate warp wire 12 in the helix. The intermediate warp wire varies for each adjacent woof wire 14. This weaving pattern results in a nearly uniform fiber or wire density in the cloth 10 as it is wound into the helix. Also, the helix will be free of any wrinkles.

All wire or fiber used to fabricate the wire cloth 10 can be treated (coated) with a catalyst material before the weaving process is performed. This significantly reduces the complexity of the catalyst coating process. Platinum, palladium, iridium, rhodium or other metals applied to stainless steel wire are all examples of suitable catalysts, but are not to be construed as limiting. In many applications, stainless steel or other alloy will provide a sufficient catalyst without requirement of an additional catalytic coating.

Figure 2:
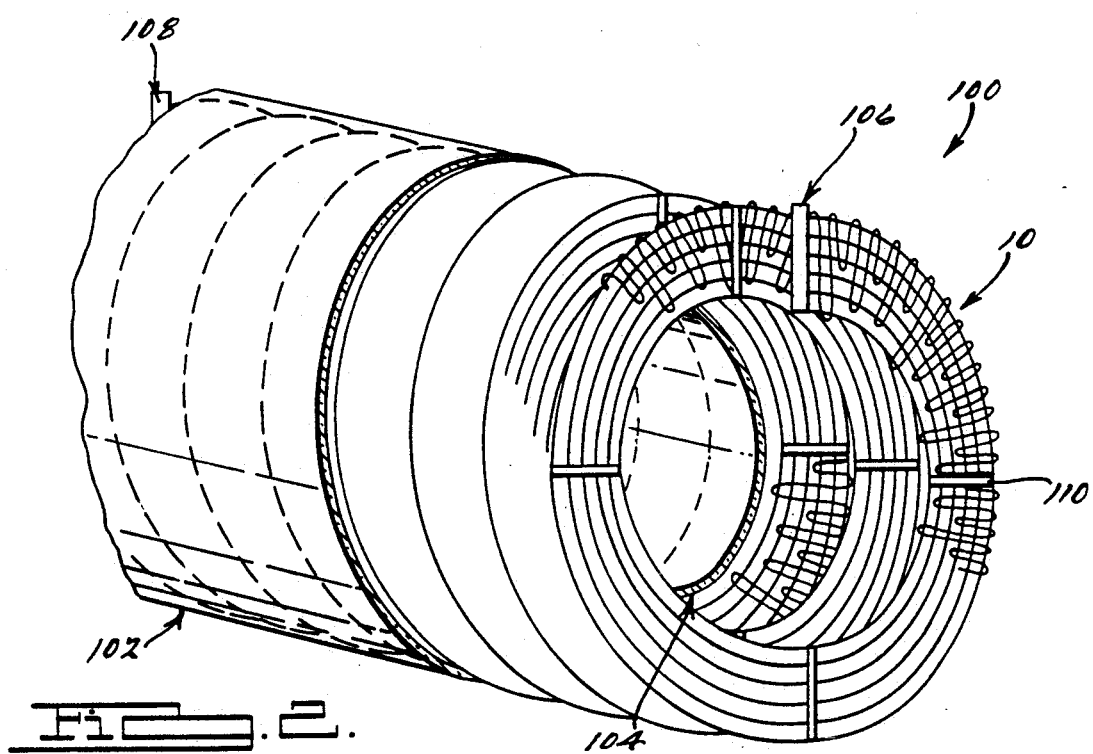
FIG. 2 is a diagram illustrating a catalytic reaction system utilizing the microlith catalyst bed of the present invention.

Referring now to FIG. 2 there is shown a catalytic reaction system 100 utilizing the wire cloth catalyst bed 10 of FIG. 1. It is noted the woof and warp wires of the wire cloth in FIG. 2 have been shown in exaggerated size for illustrative purposes. The flat helix (or flat coil) wire cloth 10 is sealed within a ceramic sleeve housing. The ceramic sleeve comprises an outer ceramic shroud 102 and an inner ceramic hub 104. The ceramic sleeve controls the spacing between the layers of the cloth helix 10 and will also electrically insulate the catalyst bed from any type of mounting container used in the application of the catalytic reaction system 100.

To facilitate electrical heating of the catalyst bed, a pair of radial bus bars 106 and 108 are attached to the leading and trailing ends of the wire cloth 10. Electrical current is applied at bus bar 106 and conducted through the length of the wire cloth 10 via the warp wires 12. Bus bar 108 provides a complete path for the electrical current back to the power source.

The conductivity of the warp wires 12 must be uniform from inside to outside radii in order to obtain a uniform current density across the entire radius of the catalyst bed. Since the inner radii warp wires will be considerably shorter in length than the outer radii warp wires, the gauge of each respective warp wire can be varied to achieve the desired electrical conductivity. A series of ceramic insulator strips 110 are attached to the surface of the wire cloth 10 to prevent the turns or layers in the flat helix from touching and electrically shorting. The insulator strips 110 also function aerodynamically to force the airflow of the reactants to flow axially through each wire cloth layer instead of flowing in the spiral channel formed between adjacent wire cloth layers in the helix. Installation of the insulating strips 110 can be achieved such as by periodically interrupting the weaving of the woof wire to weave a ceramic felt strip in place thereof between the warp wires. Each ceramic felt strip can be impregnated with a binder that will cure during a final manufacturing heat treating process. Additional ceramic felt strips would then be inserted between the ceramic felt strips woven into respective layers of the flat helix, just prior to the heat treating process, so that a mechanical bond between the ceramic felt strips is formed during the heat treating operation.

The above-described catalytic reaction system 100 is primarily applicable to automotive catalytic converters. Electrical heating is utilized to achieve rapid lightoff of the catalyst bed. Electrical conductivity of the cloth can be adjusted by changing the overall length of the cloth and by the selection of wire size and spacing used to make the cloth.

The present invention is also applicable to improving catalytic combustors used in gas turbine engines. High heat release rates for gas turbine type catalytic combustors have been demonstrated when the combustor exit temperature is maintained above 2000° F. When the engine power level is reduced due to part load operation to the point where the combustor exit temperature drops below 1800° F., the combustor efficiency will begin to drop. However, the spiral wound microlith catalyst bed of the present invention achieves significantly higher combustion efficiency while operating at lower temperatures than conventional monolith type catalyst beds. This permits the small catalyst bed volume required for high power turbine operation to also be utilized in part load operation.

Several advantages are achieved by the spiral wound microlith catalyst bed of the present invention. The catalyst bed will have a very uniform electrical heating distribution that will reduce thermal stresses caused by uneven heating. There is no leftover scrap due to the flat helix wire cloth design. This significantly reduces the cost of raw materials. Durability and reliability are also improved because there are only two electrical connections required for heating the entire catalyst bed.

It will be understood that the foregoing description of the preferred embodiment of the present invention is for illustrative purposes only, and that the various structural and operational features herein disclosed are susceptible to a number of modifications and changes, none of which departs from the spirit and scope of the present invention as defined in the appended claims.

I claim:

1. A spiral wound microlith catalyst bed for use in a catalytic reaction system for the conversion of carbon containing compounds comprising:
    a plurality of parallel warp wires coated with catalyst material, each of said plurality of warp wires increasing in length from a shortest length warp wire to a longest length warp wire;
    a plurality of woof wires coated with catalyst material woven across said plurality of parallel warp wires, wherein said plurality of warp wires and said plurality of woof wires form a spiral wound flat helix wire cloth.

2. The spiral wound microlith catalyst bed of claim 1 wherein said shortest length warp wire forms an inner radii of said flat helix and said longest length warp wire forms an outer radii of said flat helix, some of said plurality of woof wires extending across said plurality of warp wires from said outer radii to said inner radii, and the remainder of said plurality of woof wires extending across said plurality of warp wires from said outer radii to a varying intermediate warp wire in between said outer radii and said inner radii.

3. The spiral wound microlith catalyst bed of claim 1 further comprising a first electrical contact means connected to one end of said flat helix wire cloth, and a second electrical contact means connected to the other end of said flat helix wire cloth, wherein said first and said second electrical contact means provide connection to an external power source for passing an electrical current through said flat helix wire cloth to electrically heat said microlith catalyst bed.

4. The spiral wound microlith catalyst bed of claim 3 further comprising a plurality of insulator means attached to the flat surface of said flat helix wire cloth such that each of said plurality of insulator means are positioned in between respective adjacent layers of said wire cloth in said flat helix.

5. A microlith catalytic reaction system for the conversion of carbon containing compounds comprising:
   a housing made from an insulating material having an inner hub and an outer shroud;
   a microlith catalyst bed formed from a spiral wound wire cloth, the spiral windings of said wire cloth located in said housing between said inner hub and said outer shroud, wherein the carbon containing compounds pass axially through each winding of wire cloth.

6. The microlith catalytic reaction system of claim 5 wherein said microlith catalyst bed comprises:
   a plurality of parallel warp wires coated with catalyst material, each of said plurality of warp wires increasing in length from a shortest length warp wire to a longest length warp wire;
   a plurality of woof wires coated with catalyst material woven across said plurality of parallel warp wires, wherein said plurality of warp wires and said plurality of woof wires from a spiral wound flat helix wire cloth.

7. The microlith catalytic reaction system of claim 6 wherein said shortest length warp wire forms an inner radii of said flat helix and said longest length warp wire forms an outer radii of said flat helix, some of said plurality of woof wires extending across said plurality of warp wires from said outer radii to said inner radii, and the remainder of said plurality of woof wires extending across said plurality of warp wires from said outer radii to a varying intermediate warp wire in between said outer radii and said inner radii.

8. The microlith catalytic reaction system of claim 5 further comprising a first electrical contact means connected to one end of said wire cloth, and a second electrical contact means connected to the other end of said wire cloth, wherein said first and said second electrical contact means provide connection to an external power source for passing an electrical current through said wire cloth to electrically heat said microlith catalyst bed.

9. The microlith catalytic reaction system of claim 8 further comprising a plurality of insulator means attached to the surface of said wire cloth such that each of said plurality of insulator means are positioned in between respective adjacent windings of said wire cloth.

* * * * *